United States Patent [19]

Osanai

[11] Patent Number: 4,468,713

[45] Date of Patent: Aug. 28, 1984

[54] TAPE RECORDER TAPE GUIDE MECHANISM FIXED ON PINCH ROLLER LEVER

[75] Inventor: Akira Osanai, Tokyo, Japan

[73] Assignee: Olympus Optical Co., Tokyo, Japan

[21] Appl. No.: 328,473

[22] Filed: Dec. 8, 1981

[30] Foreign Application Priority Data

Dec. 15, 1980 [JP] Japan .................. 55-176876

[51] Int. Cl.$^3$ ............................................. G11B 15/60
[52] U.S. Cl. ................................................ 360/130.21
[58] Field of Search ............... 360/130.21, 96.1, 96.2, 360/96.3, 96.4, 96.5, 96.6, 105, 74.1; 226/182, 183

[56] References Cited

U.S. PATENT DOCUMENTS

| | | | |
|---|---|---|---|
| 2,862,715 | 12/1958 | MacDonald | 360/130.21 |
| 3,881,187 | 4/1975 | Nakamichi | 360/105 |
| 4,306,673 | 12/1981 | Santoro | 226/183 |
| 4,309,733 | 1/1982 | Tomabechi | 360/105 |

FOREIGN PATENT DOCUMENTS 1091353  10/1960  Fed. Rep. of Germany ...... 360/105

Primary Examiner—Bernard Konick
Assistant Examiner—Paul Stefanski
Attorney, Agent, or Firm—Frishauf, Holtz, Goodman & Woodward

[57] ABSTRACT

A tape guide mechanism for a tape recorder comprises a pair of first tape guides severally attached to the free end portions of a head lever which has a rotation center in the middle thereof, each of the first tape guides being located on the opposite side of a magnetic head on each side of the head lever to a pinch roller on a pinch roller lever and on the side where its corresponding magnetic head lies. Further, a pair of second tape guides are disposed on the pinch roller lever so as to embrace the pinch roller from both sides thereof, thereby partially covering the pinch roller.

16 Claims, 4 Drawing Figures

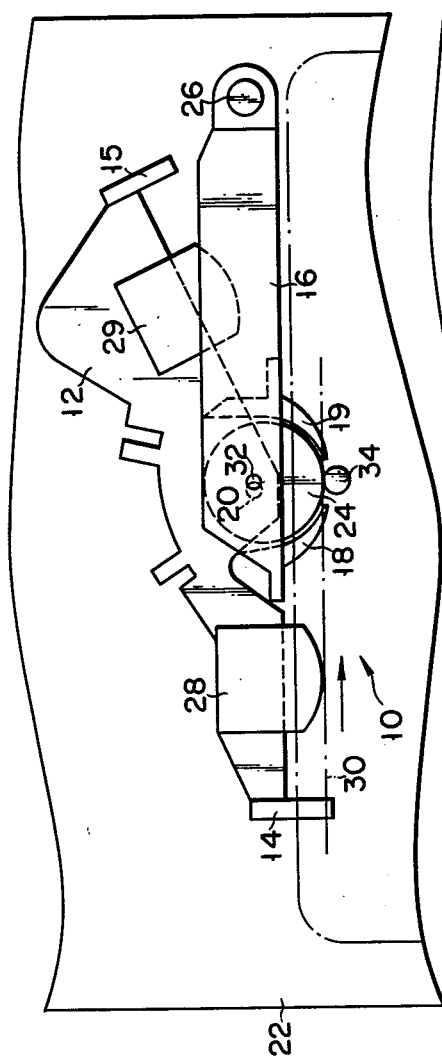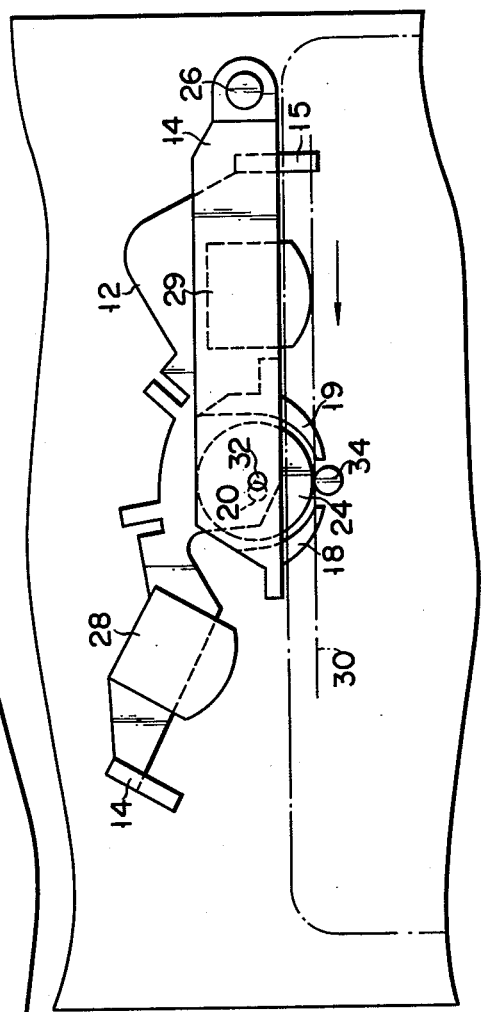

TAPE RECORDER TAPE GUIDE MECHANISM FIXED ON PINCH ROLLER LEVER

BACKGROUND OF THE INVENTION

This invention relates to a tape guide mechanism for tape recorder.

For a accurate recording and reproduction, a tape is required to run at a fixed speed and in a proper position relative to a magnetic head. In particular, the tape is expected to run without dislocation of a tape track relative to the magnetic head gap or horizontal or vertical skew. In order to maintain such proper position of the tape as it runs, the tape recorder is provided with a tape guide mechanism. A prior art tape guide mechanism generally includes a pair of tape guides each having a U-shaped notch. These tape guides are arranged on the upper- and lower-course sides of the magnetic head, respectively, along the running direction of the tape. In general, a first tape guide is fixed on the flank of a magnetic head case, while a second tape guide is formed on a head lever spaced from the magnetic head. In such a prior art tape guide mechanism, the first tape guide is located in close proximity to the magnetic head gap, so that it is hard to provide a substantial distance between the tape guides. Since compactness is required of the tape recorder, in particular, it is impossible to keep the tape guides on the head lever fully apart from the magnetic head.

It is a matter of course that the tape guides are essential members to secure tape running in a proper position relative to the magnetic head. Therefore, the tape guides need be manufactured with high accuracy and set in correct positions at assembly. There is not, however, a sufficient distance between the pair of tape guides on both sides of the magnetic head. Accordingly, errors in manufacture or installation of the tape guides, if any, will increase the tilt angle of the tape between the tape guides to greatly affect the dislocation of the tape track or skew of tape, and it will thus be harder to obtain accurate recording and reproduction. Since the first tape guide is formed integrally with the magnetic head case, the case requires high working accuracy and hence increases the cost thereof.

For accurate recording and reproduction, moreover, it is necessary to drive the tape at a constant speed. Generally, the driving force of a motor is transmitted to a flywheel by an endless belt to rotate a capstan shaft with the flywheel. Thus, the tape is held between the capstan shaft and a rotatable pinch roller. For constant-speed tape driving, it is necessary to run the tape in a fixed position between the pinch roller and the capstan shaft, more specifically, a vertically fixed position compared with the pinch roller. In the prior art arrangement, however, no consideration is given to the control of the tape location compared with the pinch roller, and the vertical vibration of the tape cannot fully be prevented.

As an example of a prior art mechanism taking account of the control of the tape location compared with the pinch roller, there may be given U.S. Pat. No. 3,881,187 (Inventor: N. Nakamichi, Patented: Apr. 29, 1975). In this mechanism, a pair of recording heads are arranged severally on both sides of a single reproducing head which is disposed in the center. Further, a pair of erasing heads are arranged on a pinch roller lever outside their corresponding recording heads. Tape guides are fixed to the respective head cases of the reproducing head and the pair of erasing heads. In such an arrangement, although one of the tape guides is located in close vicinity to the reproducing head, the distance between such tape guide and the tape guide on its corresponding erasing head can be set wide. Further, the tape guide on the erasing head can control the tape location relative to its corresponding pinch roller lever. However, the three tape guides are fixed to their corresponding head cases, so that the cases require substantial working accuracy.

SUMMARY OF THE INVENTION

It is therefore an object of this invention to provide a tape guide mechanism for a tape recorder free from the aforementioned drawbacks of the prior art mechanism, and capable of accurate recording and reproduction.

To this end, according to the invention, a tape guide, which is conventionally fixed to magnetic head cases, is arranged on a pinch roller lever. In such an arrangement, the tape guide on the pinch roller lever can be spaced from a magnetic head on a head lever. The arrangement of the tape guide on the pinch roller lever, moreover, enables a tape to run in a position adjacent to a pinch roller, and prevents vertical vibration of the tape.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 1 and 2 are partial plan views of an automatic reverse tape recorder incorporating a tape guide mechanism according to an embodiment of this invention.

DETAILED DESCRIPTION OF THE PREFERRED EMBODIMENT

Figure 3:
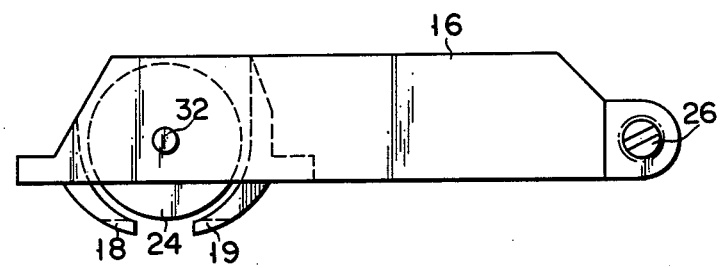
FIGS. 3 and 4 are a plan view and a front view of a pinch roller lever, respectively.

FIG. 1 shows part of an automatic reverse tape recorder incorporating a tape guide mechanism 10 according to an embodiment of this invention. As seen from FIG. 1, the tape guide mechanism 10 comprises a pair of first tape guides 14 and 15 severally disposed on a head lever 12 and a pair of second tape guides 18 and 19 severally disposed on a pinch roller lever 16. The first tape guides 14 and 15 constitute first tape guide means, while the second tape guides 18 and 19 constitute second tape guide means. The head lever 12 is rockably or pivotally mounted on a base plate 22 of the tape recorder by a rotation pin 20. The pinch roller lever 16, having a pinch roller 24 thereon, is located above the head lever 12, and is rockably or pivotally mounted on the base plate 22 by an upright post 26. The head lever 12 has magnetic heads 28 and 29 substantially in the middle of both sides of the rotation pin 20 as a rotation center, as well as the first tape guides 14 and 15 at the respective ends of the two sides. The head 28 and the tape guide 14, as well as the magnetic head 29 and the tape guide 15, are used in pairs. Namely, the first tape guide 14 is located on the head lever 12 on the opposite side of its corresponding head 28 to the pinch roller 24. Likewise, the second tape guide 15 is located on the head lever 12 on the opposite side of its corresponding head 29 to the pinch roller 24. When a magnetic tape 30 runs from left to right as shown in FIG. 1, the magnetic head 28 abuts against the tape 30 guided by the tape guide 14. When the tape 30 runs from right to left as shown in FIG. 2, the magnetic head 29 abuts against the tape 30 guided by the tape guide 15.

Figure 4:
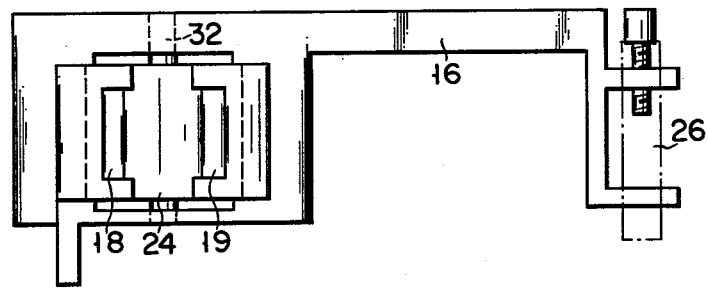

As shown in FIGS. 3 and 4, the pinch roller 24 is rotatably mounted on the pinch roller lever 16 by a shaft 32. The second tape guides 18 and 19 are arranged on the pinch roller lever 16 so as to surround the pinch roller 24 in a region separated from the head 28 and adjacent to the pinch roller 24. These tape guides 18 and 19 embrace the pinch roller 24 from both sides thereof so as partially to cover the pinch roller 24. Further, the tape guides 18 and 19 serve as guides for the tape 30 irrespectively of the running direction of the tape 30. Namely, the tape 30 is guided in its running by the tape guides 14, 18 and 19 in FIG. 1, and by the tape guides 15, 19 and 18 in FIG. 2. Thus, the distances between the tape guides 14 and 19 (FIG. 1) and between the tape guides 15 and 18 (FIG. 2) can be set wide.

In the tape guide mechanism for tape recorder according to this invention, as described above, the first tape guide means is attached to the head lever, and the second tape guide means is attached to the pinch roller lever at a space from a corresponding magnetic head. In such an arrangement, the distance between the first and second tape guide means can be made wide. Despite errors in manufacture or installation of the tape guides 14, 15, 18 and 19, therefore, the tilt angle of the tape between the tape guides is smaller as compared with the case of the prior art tape guide mechanism. Accordingly, it is possible to restrain the dislocation of the tape track or skew of the tape attributable to errors in manufacture or installation, and thereby to ensure accurate recording and reproduction. Whereas one of the tape guides of the prior art tape guide mechanism is formed fixed to the magnetic head case, the tape guide mechanism of this invention is provided with no such tape guide. Therefore, the magnetic head case does not require very high working accuracy, and can be produced at lower cost. Since the second tape guides 18 and 19 are arranged on the pinch roller lever, the relative positions of the tape guides 18 and 19 compared with the pinch roller can be set with high accuracy. Thus, the position of the tape relative to the pinch roller can satisfactorily be controlled, and the tape guides 18 and 19 can fully prevent vertical vibration of the tape to ensure more accurate recording and reproduction.

In the above-mentioned embodiment, the tape guide mechanism according to this invention is incorporated in an automatic reverse tape recorder. It is to be understood, however, that the tape guide mechanism of the invention is not limited to use in an automatic reverse tape recorder, and may also be applied to any other tape recorders. Incorporated in the automatic reverse tape recorder, moreover, the pinch roller 24 is embraced from both sides by the second tape guides 18 and 19. Furthermore, these tape guides 18 and 19 can fulfill their functions without regard to the running direction of the tape. By thus guiding the tape on both sides of the pinch roller, the vertical vibration of the tape can more securely be avoided. In use with a standard tape recorder, however, the second tape guide means need not include both of the two second tape guides 18 and 19, and is expected only to include at least one second tape guide.

What is claimed is:

1. In a tape recorder comprising a base, a head lever pivotally mounted on the base about a rotation center, a magnetic head mounted on the head lever and positioned apart from said rotational center of the head lever, a capstan rotatably mounted on the base and positioned adjacent to said rotational center of the head lever, a pinch roller lever pivotally mounted on the base, and a pinch roller rotatably supported by the pinch roller lever and adapted to pinch a magnetic tape together with the capstan to drive the magnetic tape, the improvement comprising improved tape guide means for guiding the magnetic tape, said improved tape guide means including:

a first tape guide mounted on said head lever and being positioned on one side of said magnetic head, said pinch roller being positioned on the opposite side of said magnetic head, and said pinch roller being spaced from said magnetic head; and a second tape guide attached to said pinch roller lever, said second tape guide being positioned between said magnetic head and said pinch roller, and extending to reach a region near said capstan.

2. The tape recorder of claim 1, wherein said second tape guide has an arcuate shape and partially embraces said pinch roller.

3. The tape recorder of claim 2, wherein said second tape guide has a free end having a guide groove formed therein, said guide groove having a width substantially equal to that of the magnetic tape.

4. The tape recorder of claim 3, wherein said second tape guide is formed integrally with said pinch roller lever.

5. The tape recorder of claim 2, wherein said second tape guide is formed integrally with said pinch roller lever.

6. The tape recorder of claim 1, wherein said second tape guide has a free end having a guide groove formed therein, said guide groove having a width substantially equal to that of the magnetic tape.

7. The tape recorder of claim 6, wherein said second tape guide is formed integrally with said pinch roller lever.

8. The tape recorder of claim 1, wherein said second tape guide is formed integrally with said pinch roller lever.

9. In a reversible tape recorder comprising a base, a head lever pivotally mounted on the base and having a rotational center at the central portion thereof, a pair of magnetic heads disposed on the head lever on both sides of said rotational center, each magnetic head being spaced apart from said rotational center, a capstan rotatably mounted on the base and positioned adjacent to said rotational center of the head lever and spaced from the magnetic head, a pinch roller lever pivotably mounted on the base, and a pinch roller rotatably supported by the pinch roller lever and adapted to pinch a magnetic tape together with the capstan to drive the magnetic tape, the improvement comprising improved tape guide means for guiding the magnetic tape, said improved tape guide means including:

a pair of first tape guides disposed on the end portions of said head lever, each first tape guide being mounted farther from said rotation center than a corresponding magnetic head so that they are disposed outside of said heads, each first and second tape guide being spaced apart from its corresponding magnetic head; and a pair of second tape guides attached to said pinch roller lever and positioned on respective opposite sides of said pinch roller and extending along said pinch roller in the respective tape running directions to reach regions near said capstan so as to guide said magnetic tape in regions near said capstan.

10. The reversible tape recorder of claim 9, wherein each of said second tape guides has an arcuate shape and partially embraces the pinch roller.

11. The reversible tape recorder of claim 10, wherein each of said second tape guides has a free end, said free ends each having a guide groove of a width substantially equal to that of the magnetic tape.

12. The reversible tape recorder of claim 11, wherein said second tape guides are formed integrally with said pinch roller lever.

13. The reversible tape recorder of claim 10, wherein said second tape guides are formed integrally with said pinch roller lever.

14. The reversible tape recorder of claim 9, wherein each of said second tape guides has a free end, said free ends each having a guide groove of a width substantially equal to that of the magnetic tape.

15. The reversible tape recorder of claim 14, wherein said second tape guides are formed integrally with said pinch roller lever.

16. The reversible tape recorder of claim 9, wherein said second tape guides are formed integrally with said pinch roller lever.

* * * * *